United States Patent Office 3,816,563
Patented June 11, 1974

3,816,563
THERMOPLASTIC COMPOSITIONS
Carl Fraser Mathews, 4 Bramshot Close, London Road, Hitchin, England; Eric Nield, 12A Beane Road, Watton-at-Stone, England; John Brewster Rose, "Uluvia," Pasture Road, Letchworth, England; and Peter Incledon Vincent, 27 Coneydale, Welwyn Garden City, England
No Drawing. Continuation-in-part of application Ser. No. 860,100, Sept. 22, 1969, which is a continuation of application Ser. No. 539,738, Apr. 4, 1966, both now abandoned. This application Mar. 22, 1972, Ser. No. 236,976
Int. Cl. C08f 19/18
U.S. Cl. 260—876 R    6 Claims

ABSTRACT OF THE DISCLOSURE

Graft copolymers comprising a substrate of a diene rubber and a superstrate containing a high proportion of copolymerised acrylonitrile and blends of such graft copolymers with polymers containing a high proportion of acrylonitrile units.

---

This application is a continuation-in-part application of our application Ser. No. 860,100 filed Sept. 22, 1969, now abandoned, which was a continuation application of our application Ser. No. 539,738 filed Apr. 4, 1966, now abandoned.

This invention relates to thermoplastic compositions derived from a diene rubber and a resin, and to the production of shaped articles therefrom.

In particular, it relates to "graft" copolymers comprising a substrate of a diene rubber and a superstrate containing a high proportion of copolymerised acrylonitrile, and to blends of such "graft" copolymers with polymers containing a high proportion of acrylonitrile units. The products of the invention are tough and at the same time rigid and unusually hard.

The superstrate contains a high proportion of acrylonitrile with at least one other ethylenically unsaturated monomer copolymerisable using free-radical catalysts, not being a conjugated aromatic olefine. In particular, one of the comonomers may be an N-aryl maleimide providing at least 1% molar of the units in the superstrate. Aromatically conjugated monomers such as styrene and α-methylstyrene are excluded from the superstrate owing to their normally inhomogeneous copolymerisation with acrylonitrile. Rubber-free resins from the superstrate monomers are exceptionally strong materials with high softening points, but they are insufficiently tough for many purposes.

The superstrate contains from 45% to 90% (preferably 60% to 84%) molar of units from acrylonitrile, from 0% to 20% (preferably not more than 10%) molar of units from at least one N-aryl maleimide, and from 5% to 35% (preferably 15% to 30%) molar of units from at least one other ethylenically unsaturated monomer copolymerisable using free radical catalysts but not including a conjugated aromatic olefine.

The N-aryl maleimides are conveniently obtained from anilines (primary arylamines). Many different anilines are readily available and yield N-aryl maleimides that may be used as comonomers for the copolymers. The aryl substituent is derived from an aromatic hydrocarbon or heterocycle in which one or more of the hydrogen atoms may be replaced by other atoms or groups. Substituents containing active hydrogen atoms, however, are generally to be avoided because they may interfere with polymerisations catalysed by free radicals. The aryl groups that may be present in the N-aryl maleimides include, for example phenyl, 4-diphenyl, 1-naphthyl, all the mono- and di-methylphenyl isomers, 2,6-diethylphenyl, 2-, 3- and 4-chlorophenyl, 4-bromophenyl and other mono- and di-halophenyl isomers, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl and methylchlorophenyl (2,3-, 2,4-, 2,5- and 4,3-isomers). The N-(o-substituted phenyl) maleimides are generally less coloured than the other isomers or the unsubstituted compounds and may therefore be preferred if a relatively colourless product is desired.

The other ethylenically unsaturated monomer is any such monomer (other than a conjugated aromatic olefine) that is copolymerisable using free-radical catalysts. Such monomers usually (but not always) contain olefinic methylene groups, and include for example, alkenes such as ethylene, propylene, butene-1, isobutene, pentene-1, hexene-1, 2-methylbutene-1, 2-methylphentene-1, 4-methylpentene-1, 2,4,4-trimethylpentene-1, octene, octadecene, cyclohexene and methylenecyclohexane, dienes such as butadiene and norbornadiene, esters of acrylic and methacrylic acids such as methyl, ethyl, n-butyl and 2-ethylhexyl acrylates and methyl and n-butyl methacrylates, vinyl esters such as vinyl acetate, vinyl ethers such as methyl and ethyl vinyl ethers, esters of fumaric acid, and unsaturated nitriles such as methacrylonitrile, vinylidene cyanide, α-methyleneglutaronitrile, α-acetoxyacrylonitrile, α-cyanostyrene, and esters of α-cyanoacrylic acid. In minor amounts, there may be present for example vinyl chloride, vinylidene chloride, α-chloroacrylonitrile, diallyl ether, divinyl ether and glycol dimethacrylate.

The diene rubber in the substrate contains from 40% to 100% molar of at least one conjugated 1,3-diene monomer and from 0% to 60% of at least one other ethylenically unsaturated monomer copolymerisable with free-radical catalysts. Suitable dienes include for example, butadiene, isoprene, 2,3-dimethylbutadiene, piperylene and chloroprene. As comonomers acrylonitrile and styrene are particularly convenient, although a wide variety of other monomers may be used, including many of those listed above as examples of ethylenically unsaturated comonomers for the superstrate. Diene homopolymers (e.g. polybutadiene) and copolymers with a low proportion of comonomer have lower glass transition temperatures and may therefore be preferable especially when the product is required for service at low temperatures.

The compositions of the invention can be produced by a process comprising sequential polymerisation. In this process, the monomers for the superstrate are polymerised by free-radical catalysis in the presence of the diene rubber. The process is carried out using the appropriate techniques for polymerisation catalysed by free radicals, conveniently in bulk or in aqueous suspension or emulsion. A similar emulsion process or a stereospecific process may be used to make the diene rubber. The "graft" copolymer may then be employed as a latex or isolated from the polymerisation medium, freed from residual monomers, and dried. The product of this sequential polymerisation may be blended if desired with a resin, e.g. a resin formed from the superstrate monomers. This blending step can be used to produce tough and strong compositions. The graft are therefore, according to the invention, useful materials for blending with resins to give tough compositions. The resin used for blending is not necessarily one made from the same monomers as the "grafted" portion but can be any resin of adequate strength especially one having a high content of nitrile groups. This may be for example a copolymer of acrylonitrile (45% to 90% molar, preferably 60% to 84% molar) with at least one other copolymerisable ethylenically unsaturated monomer, e.g. a homogeneous copolymer with a conjugated aromatic olefine. The resin may also contain 0 to 20% of at least one N-aryl maleimide, particularly 1 to 20% although 0 to 1% may be present.

A product in many ways equivalent to such a blend may also be obtained directly by adjusting the conditions of the "grafting" polymerisation so that some of the superstrate monomers copolymerise to give some separate resin as well as the "graft."

The resultant products are thus composed at least partially of the type of material usually referred to as "graft copolymer." It is possible, however, that the superstrate in the "grafted" material is not all chemically bonded to the rubber but contains resin from the superstrate monomers associated with the rubber in a much more intimate physical mixture than can normally be obtained by blending preformed polymers.

The amount of rubber in the final blend is not the only factor governing toughness, which depends also on the amount of resin "grafted" on to the rubber in the "graft" used for blending.

Preferably, the blend comprises from 1% to 50% by weight of the diene rubber. Compositions containing below 25% of the rubber are particularly hard scratch-resistant materials with high impact strength, and while there is an apparently smooth transition of properties the compositions containing at least 20% (preferably not more than 40%) of the rubber tend to be hard materials with very high impact strength. In the blend the weight ratio of superstrate to resin should be less than 1.6. The ratio is given by the formula $bc/100$ $(a-c)$ where $a$ is weight percentage of rubber in the graft, $b$ is the weight percentage of superstrate in the graft and $c$ is the weight percentage of rubber in the blend.

Preferred blends according to the invention, unlike some rubber/resin blends, show no apparent separation of phase on warming from $-180°$ C. to $+20°$ C.

The compositions of the invention, mixed with any desired fillers or reinforcing materials, lubricants and stabilisers, can be used as thermoplastic raw materials to make articles which require a good resistance to impact. Their toughness coupled with high strength and high softening point may thus be displayed to advantage. For example, the compositions may be extruded into sheet or tube, and the sheet can be calendered with embossing if desired or can be shaped as required, e.g. by pressing, drawing or vacuum-forming. The compositions can also be compression-moulded and injection-moulded. Examples of articles that may thus be produced using the compositions of the invention include panelling and exterior casing for machinery (as in motor cars, office machines and household equipment), crash helmets, pipes for conveying fluids, and telephone receivers. The use of compositions of the invention having superior tensile strength coupled with rigidity and toughness may allow enconomy of material in comparison with currently used products in that thinner pieces would serve the same purpose. The advantageous physical properties of the compositions may also permit them to be used in enginering applications for which plastics have not hitherto been suitable.

The toughness of a material such as a thermoplastic polymer is connected with the amount of energy that the material is capable of absorbing without breaking when stressed in tension, and this in turn is related to the way in which the material behaves when stressed in tension at different temperatures. When an increasing uniaxial tensile stress is applied at any one temperature, the material will eventually either break or yield. The material breaks before yielding if it is brittle, and whether or not it is brittle depends on the temperature. There is a temperature (the "brittle point") peculiar to any particular material above which it undergoes brittle fracture. At temperatures below the brittle point, the amount of energy the material can absorb when stressed in tension is low and varies little with temperature. Above the brittle point, however, the amount of energy that can be absorbed rises steeply as the temperature increases. To be tough at room temperature, therefore, a material should have a relatively low brittle point.

The brittle points of two different materials can be compared indirectly by comparing their properties under stress, first at a low temperature where both materials are brittle, and secondly at a higher temperature where neither material is brittle. Convenient temperatures for these tests are obtained by using liquid nitrogen (the sample being at about $-180°$ C.) and room temperature ($+20°$ C.) respectively. Up to its brittle point, the stress at which a material breaks falls only slightly as the temperature increases. Above the brittle point, however, the stress at which the material yields falls relatively steeply as the rise of temperature continues. Consider therefore two materials which break at the same stress at $-180°$ C. but have different brittle points. The material with the lower brittle point (the tougher material) will yield at the lower stress at $+20°$ C. Conversely, the tougher of two different materials yielding at the same stress at $+20°$ C. will be the one which breaks at the higher stress at $-180°$ C.

In order to toughen a material, therefore, it is desirable to alter its composition so as to preserve a high resistance to brittle fracture at $-180°$ C. but reduce the stress at which it yields at $+20°$ C.

Resins containing a high proportion of homogeneously copolymerised acrylonitrile have unusually high breaking stresses at $-180°$ C. and high yielding stresses at $+20°$ C. According to the invention it has been found that "graft" copolymers and their blends may be produced so as largely to retain the high breaking stress at $-180°$ C. but having a reduced yielding stress at $+20°$ C. Owing to the high breaking stress at $-180°$ C., the yielding stress at $+20°$ C. can be reduced sufficiently for the product to become tough while remaining adequately rigid and hard. The invention accordingly provides materials which have a good resistance to impact coupled with excellent structural properties.

The breaking stress at $-180°$ C. was measured on specimens 51 mm. long and 12.7 mm. wide milled from a compression-moulded sheet 3 mm. thick. The specimen rested on two supports 38.1 mm. apart and midway between them a load was applied sufficient to bend the specimen at the rate of 457 mm./min. The breaking stress was calculated by multiplying the load at the moment of rupture by the factor:

$$(1.5)(38.1)/(12.7)(3)^2 = 0.5$$

The yielding stress at $+20°$ C. was measured on specimens 76 mm. long and 14 mm. wide milled from a compression-moulded sheet 3 mm. thick. The cross-sectional area across the centre of the specimen was reduced to 9 mm.$^2$ by milling two slots (radius of curvature 31 mm.) opposite each other in the long edges so that the narrowest width of the specimen was 3 mm. A tensile stress was then applied to the specimen sufficient to elongate it at the rate of 12.7 mm./min. and the stress at the yield point was recorded.

For comparison with the data of the examples below, the flexural breaking stress at $-180°$ C. of the rubber-free resins formed from the superstrate monomers is usually about 25 kg./mm.$^2$ and the tensile yielding stress is usually about 11 kg./mm.$^2$. The compositions of the invention often largely retain the high breaking stress at $-180°$ C. characteristic of the resins but have improved toughness (as may be indicated by the greatly reduced yielding stress).

As explained above, a useful indication of the relative toughness of materials is often given by comparing their flexural breaking stresses at $-180°$ C. and their tensile yielding stresses at +20° C. With materials that are so tough as not to be brittle in the tensile test at −40° C., however, this approach loses some of its value. An additional test (the "notched specimen impact test") has therefore been used to supplement the comparative measurements on such materials.

In this test, a specimen 60 mm. long, 6.5 mm. wide and 3 mm. thick was given a 45° notch 2.8 mm. deep (tip radius not more than 0.25 mm.) in the centre of one edge. It was supported between two supports 50 mm. apart and struck centrally on the edge opposite the notch by a pendulum dropping from 30 cm. with more than sufficient energy to break the specimen. From the residual energy of the pendulum the energy required to break the specimen was calculated and divided by the cross-sectional area of the specimen at the notch. The resulting value (expressed in joules/cm.$^2$) represented the energy required to cause cracks to propagate in the material.

Using this test at room temperature (20–26° C.), various "ABS" materials broke at 0.5 J/cm.$^2$ or somewhat above. Compositions of the invention have been found to have similar "toughness" in this test; for example the prducts of Example 1 and Example 7 broke at 0.47 J/cm.$^2$ and 0.44 J/cm.$^2$ respectively. Thus compositions of the invention possess toughness in combination with exceptionally high tensile strength.

The following examples illustrate the invention. "Breaking stress," "yielding stress," and "toughness" were measured as described above. Measurements were made at +20° C. (room temperature) unless otherwise indicated.

EXAMPLE 1

Acrylonitrile (75% molar), N-phenylmaleimide (5% molar) and isobutene (20% molar) monomers were copolymerised in the presence of a rubber latex, not short-stopped, formed of 30% molar acrylonitrile and 70% molar butadiene and containing 49.4% solids of which 77% was insoluble in methyl ethyl ketone.

The latex (55.85 g.) was brought to pH 5.7 with 0.1 N sulphuric acid and placed in a shaking autoclave. A solution of N-phenylmaleimide (14.25 g.) in acrylonitrile (65.8 g.) was added, together with water (650 cm.$^3$), potassium persulphate (1.55 g.) and sodium metabisulphite (1.03 g.). The contents of the autoclave were repeatedly pressurised to 7 kg./cm.$^2$ with nitrogen and vented. Isobutene (18.8 g.) was then added and the reaction mixture was maintained at 30° C. for 18 hours under nitrogen at 7 kg./cm.$^2$. The solid composition (97.1 g.) was isolated by adding an aqueous solution (10 cm.$^3$) of calcium chloride saturated at room temperature, washing the solid six times with water at 90° C. and then with cold methanol, and drying under vacuum at 70° C. Assuming that the product comprised all the rubber initially employed, it contained 28.4% rubber and 20% butadiene. The full Vicat and one-tenth Vicat softening points of the material were 102° C. and 93° C. respectively.

On compression-moulding the composition gave a clear yellow plaque. Its breaking stress at −180° C. and yielding stress at +20° C. were respectively 25 kg./mm.$^2$ and 5.9 kg./mm.$^2$. Similar measurements on commercially available acrylonitrile/butadiene/styrene terpolymers and blends ("ABS" materials) showed breaking stresses at −180° C. of 13 to 17 kg./mm.$^2$ and yielding stresses at +20° C. of 3.9 to 5.6 kg./mm.$^2$.

The melt viscosity of the composition was 12.5 kp. at 260° C., measured at a shear rate of 100/s. The extrudate was transparent and pale yellow and the melt viscosity remained unchanged over five minutes at 260° C.

EXAMPLE 2

The process described in Example 1 was repeated, using a rubber latex (67.9 g.) formed of 21% molar acrylonitrile and 79% molar butadiene and containing 40.7% solids.

The isolated solid composition (105 g.) contained 26.3% rubber and 18% butadiene. The full Vicat and one-tenth Vicat softening points were 105° C. and 91° C. respectively. Its breaking stress at −180° C. was 22 kg./mm.$^2$ and its yielding stress at +20° C., 0° C., −20° C. and −40° C. was 5.7, 7.4, 9.0 and 104 kg./mm.$^2$ respectively. At −60° C. it was brittle, breaking at 12.7 kg./mm.$^2$. Its melt viscosity was 17 kp. at 260° C., measured at 1000/s.

EXAMPLE 3

The process described in Example 1 was repeated, using 74.96 g. of the rubber latex at its unadjusted pH of 7.3.

The isolated solid composition (111 g.) contained 33.3% rubber and 23.8% butadiene. The full Vicat and one-tenth Vicat softening point were 102° C. and 91° C. respectively. Its breaking stress at −180° C. was 23 kg./mm.$^2$ and its yielding stress at +20° C., 0° C., −20° C., −40° C. and −60° C. was 5.1, 6.5, 8.2, 10.1 and 13.3 kg./mm.$^2$ respectively. Its melt viscosity was 14 kp. at 260° C., measured at 1000/s.

EXAMPLE 4

The process described in Example 1 was repeated, using a rubber latex (38.95 g.) formed of 21% molar acrylonitrile and 79% molar butadiene and containing 47.5% solids.

The isolated solid composition (98 g.) contained 18% rubber and 14.5% butadiene. The full Vicat and one-tenth Vicat softening points were 108° C. and 71° C. respectively. Its yielding stress at +80° C., +60° C., +20° C. and −20° C. was 2.4, 3.8, 6.3 and 9.3 kg./mm.$^2$ respectively. At −60° C. it was brittle, breaking at 14.4 kg./mm.$^2$.

EXAMPLE 5

The process described in Example 1 was repeated, using a rubber latex (77.9 g.) of the same molar composition but containing 47.5% solids.

The isolated solid composition (112 g.) contained 33% rubber and 26% butadiene. The full Vicat and one-tenth Vicat softening points were 103° C. and 93° C. respectively. Its yielding stress at +80° C., +60° C., +20° C., −20° C. and −60° C. was 1.5, 3.0, 5.0, 7.5 and 12.6 kg./mm.$^2$ respectively.

EXAMPLE 6

The process described in Example 1 was repeated, using a rubber latex (87.8 g.) of the same molar composition but containing 47.5% solids.

The isolated solid composition (96.8 g.) contained 42.9% rubber and 33.8% butadiene. The full Vicat and one-tenth Vicat softening points were 103° C. and 91° C. respectively. Its yielding stress at +80° C., +60° C., +20° C., −20° C. and −60° C. was 1.2, 2.1, 3.6, 5.7 and 10.8 kg./mm.$^2$ respectively.

EXAMPLE 7

Acrylonitrile (75% molar), N-2-chlorophenylmaleimide (5% molar) and methyl acrylate (20% molar) monomers were copolymerised in the presence of a rubber latex, not short-stopped, formed of 32% molar acrylonitrile and 68% molar butadiene and containing 48.4% solids, as described in Example 1.

The latex (57.06 g.; 27.6 g. solids) was brought to pH 5.7. Acrylonitrile (65.8 g.) and methyl acrylate (28.55 g.) were added, together with sodium metabisulphite (0.33 g.), potassium persulphate (0.5 g.) and water (650 cm.$^3$). The polymerisation was conducted as described in Example 1 for 21 hours at 30° C. to yield 112 g. solids. The isolated composition contained 24.7% rubber and 16.9% butadiene. On compression-moulding at 200° C. it gave a transparent pale yellow plaque. This had a breaking stress at −180° C. of 23.2 kg./mm.$^2$, a yielding stress at +20° C. of 7.2 kg./mm.$^2$, and a melt viscosity of 20 kp. at 260° C. and a shear rate of 1000/s.

EXAMPLE 8

The process described in Example 7 was repeated using 76.5 g. of the latex (37 g. solids). The solid composition (124.2 g.) when isolated contained 29.8% rubber and 20.4% butadiene. On compression-moulding at 200° C. it gave a transparent and very pale yellow plaque. This had full and one-tenth Vicat softening points at 95° C. and 85° C. respectively, a breaking stress at −180° C. of 23.3 kg./mm.$^2$, and a melt viscosity of 21 kp. at 260° C. and a shear rate of 1000/s.

EXAMPLE 9

Resin monomers were copolymerised as described in Example 1 in the presence of a rubber latex, not short-stopped, formed of 46% molar acrylonitrile and 54% molar butadiene, and containing 45% solids.

The latex (containing 69.6 g. solids) was used at pH 5.7, with N-phenylmaleimide (2.1 g.), acrylonitrile (9.3 g.), isobutene (2.5 g.), sodium metabisulphite (0.1 g.), potassium persulphate (0.15 g.) and water (46 cm.$^3$). The polymerisation was conducted for 4 hours at 30° C. The resultant product (containing 83% rubber) was then blended as a latex with a resin latex (formed as above in the absence of rubber) to give a final composition containing 25% rubber. This had full and one-tenth Vicat softening points of 104° C. and 78° C. respectively, a breaking stress at −180° C. of 19.3 kg./mm.$^2$, a yielding stress at +20° C. of 3.8 kg./mm.$^2$, and a melt viscosity of 10 kp: at 260° C. and a shear rate of 1000/s. The melt viscosity remained unchanged over 5 minutes at 260° C.

When the polymerisation was conducted at 35° C., the blended product containing 25% rubber otherwise being prepared as described above, the material produced had full and one-tenth Vicat softening points of 110° C. and 92° C. respectively, a breaking stress at −180° C. of 19.8 kg./mm.$^2$, a yielding stress at +20° C. of 3.75 kg./mm.$^2$, and a melt viscosity of 11 kp. at 260° C. and a shear rate of 1000/s. The melt viscosity remained unchanged over 5 minutes at 260° C. The superstrate/resin ratio is 0.073.

EXAMPLE 10

A rubber "graft" for blending with a separately prepared resin was made by copolymerising acrylonitrile 75% molar), N-phenylmaleimide (5% molar) and isobutene (20% molar) in the presence of a rubber latex not short-stopped formed of 30% molar acrylonitrile and 70% molar butadiene and containing 47.5% solids.

The latex (147.5 g.) was adjusted to pH 5.7 and placed with water (680 cm.$^3$), ammonium persulphate (1.40 g.) and sodium metabisulphite (1.08 g.) in a one-litre shaking autoclave, which was then thrice pressurised to 7 kg./cm.$^2$ with nitrogen and vented. N-phenylmaleimide (10.1 g.) and acrylonitrile (6.15 cm.$^3$) were added, and the autoclave was again thrice pressurised to 7 kg./cm.$^2$ with nitrogen and vented. Finally isobutene (21.9 cm.$^3$) was added and the autoclave was shaken at 30° C. for 18 hours under nitrogen at about 4 kg./cm.$^2$. The product was a white latex containing 13.5% solids of which about 58% was rubber.

This product was blended with a latex of a homogeneously copolymerized copolymer of acrylonitrile (78% molar) and styrene (22% molar) and the blends were coagulated to give strong tough compositions. Their properties are tabulated below.

| | | |
|---|---|---|
| Rubber in blend, percent | 10 | 25 |
| Superstrate/resin ratio | 0.09 | 0.31 |
| Yielding stress, kg./mm.$^2$ | 8.6 | 5.8 |
| Toughness, J/cm.$^2$ | 0.4 | 3.2 |
| Vicat softening point, ° C.: | | |
| Full | 106 | 106 |
| 1/10 | 100 | 88 |

EXAMPLE 11

The process described in Example 10 was repeated, except that methyl acrylate (22.7 cm.$^3$; 20% molar) was used instead of isobutene and was added to the autoclave with the other monomers. The product was a latex containing 16.3% solids of which about 47% was rubber. The isolated graft had full and one-tenth Vicat softening points of 90° C. and 78° C. respectively and a yielding stress of 2.4 kg./cm.$^2$.

The product was blended as a latex with a latex of an acrylonitrile/styrene copolymer as in Example 10 and the blend coagulated to give a strong tough composition containing 25% rubber having full and one-tenth Vicat softening points of 104° C. and 93° C. respectively, a yielding stress of 5.7 kg./mm.$^2$, and a toughness in the notched specimen impact test of 2.6 J/cm.$^2$. The superstrate/resin ratio was 0.60.

EXAMPLE 12

Rubber "grafts" were prepared by the process described in Example 10, using the quantities of rubber and monomers tabulated below.

| Starting materials: | | | | | | |
|---|---|---|---|---|---|---|
| Rubber (g.) | 240 | 166 | 180 | 339 | 140 | 106 |
| Acrylonitrile (g.) | 72.3 | 72.3 | 147.9 | 224 | 224 | 224 |
| N-phenylmaleimide (g.) | 15.7 | 15.7 | 30.3 | 45.4 | 45.4 | 45.4 |
| Isobutene (g.) | 20.4 | 20.4 | 42.3 | 63.5 | 63.5 | 63.5 |
| Water (cm.$^3$) | 2,400 | 1,700 | 2,040 | 2,500 | 2,500 | 2,500 |
| Na$_2$S$_2$O$_5$ (g.) | 1.80 | 1.80 | 4.0 | 6.0 | 6.0 | 6.0 |
| K$_2$S$_2$O$_8$ (g.) | 2.16 | 2.16 | 4.4 | 6.6 | 6.6 | 6.6 |
| Properties of the isolated "grafts": | | | | | | |
| Percent rubber | 91 | 74 | 66 | 53 | 35 | 29 |
| Breaking stress, kg./mm.$^2$ | 0.3 | 0.5 | 1.6 | | | |
| Yielding stress, kg./mm.$^2$ | | | | 2.4 | 4.1 | 5.0 |

These "grafts" as latices were blended with the latex of a resin made by a process generally similar to that of Example 10 (but omitting the rubber) from acrylonitrile (1750 cm.$^3$), N-phenylmaleimide (304.5 g.), isobutene (655 cm.$^3$), sodium metabisulphite (10.37 g.), ammonium persulphate (12.5 g.), sodium dodecyl sulphate (12.25 g.) and octanethiol (5.6 cm.$^3$). This resin when isolated had a reduced viscosity of 1.0 at 0.5% in dimethylformamide at 25° C. The amount of the resin added to each of the "grafts" was such that all the final blends contained 20% by weight of rubber. The products were isolated using 0.75% aqueous calcium chloride, washed and dried. Their properties are tabulated below.

| | | | | | | |
|---|---|---|---|---|---|---|
| Rubber in "graft" by weight, percent | 91 | 74 | 66 | 53 | 35 | 29 |
| Superstrate/resin ratio | 0.024 | 0.09 | 0.14 | 0.29 | 0.86 | 1.6 |
| Yielding stress, kg./mm.$^2$ | 6.1 | 5.6 | 7.7 | 7.4 | 7.0 | 6.9 |
| Toughness, J/cm.$^2$ | 0.23 | 0.61 | 0.65 | 1.02 | 0.58 | 0.60 |

Outstanding toughness is shown by the blend made with the "graft" containing 53% of rubber.

EXAMPLE 13

A rubber "graft" for blending with a separately prepared resin was made by copolymerising acrylonitrile (80% molar) and methyl acrylate (20% molar) in the presence of a rubber latex not short-stopped formed from 30% molar acrylonitrile and 70% molar butadiene and containing 47.5% solids.

The latex (126.4 g.) was adjusted to pH 5.7 and placed with water (600 cm.$^3$), ammonium persulphate (1.20 g.) and sodium metabisulphite (0.99 g.) in a one-litre shaking autoclave, which was then thrice pressurized to 7 kg./cm.$^2$ with nitrogen and vented. Acrylonitrile (53.0 cm.$^3$) and methyl acrylate (18.1 cm.$^3$) were added, and the autoclave was again thrice pressurised to 7 kg./cm.$^2$ with nitrogen and vented. The autoclave was shaken at 30° C. for 16 hours under nitrogen at about 1.6 kg./cm.$^2$. The product contained 61% of rubber.

A sample of the "graft" latex was coagulated using 0.75% aqueous calcium chloride to give a polymer which was washed twice with water and twice with methanol and dried and then gave transparent yellow mouldings at 200° C.: full Vicat softening point 65° C.; toughness 1.63 J/cm.²

The "graft" latex was blended with the latex of a resin made by a process generally similar to that of Example 11 (but omitting the rubber) from acrylonitrile (75% molar), N-phenylmaleimide (5% molar) and methyl acrylate (20% molar). The amount of the resin latex added was such that the resulting blend contained 10% of rubber. The superstrate/resin ratio was 0.07. The product was isolated using 0.75% aqueous calcium chloride and washed and dried. It gave transparent yellow mouldings at 200° C.: full Vicat softening point 94° C.; yielding stress 8.3 kg./mm.²; toughness 2.10 J/cm.²

EXAMPLE 14

A rubber "graft" for blending with a separately prepared resin was made by copolymerising acrylonitrile (80% molar) and isobutene (20% molar) in the presence of a rubber latex not short-stopped formed from 30% molar acrylonitrile and 70% molar butadiene and containing 47.5% solids.

The latex (105.0 g.) was adjusted to pH 5.7 and placed with water (600 cm.³), ammonium persulphate (1.10 g.), sodium metabisulphite (0.91 g.) and acrylonitrile (53.0 cm.³) in a one-litre shaking autoclave, which was then thrice pressurised to 7 kg./cm.² with nitrogen and vented. Isobutene (18.7 cm.³) was then added and the pressure raised to about 5.6 kg./cm.². The autoclave was shaken at 30° C. for 17 hours under nitrogen at about 6 kg./cm.². The product contained 64% of rubber.

A sample of the "graft" isolated as in Example 13 gave transparent amber mouldings at 200° C.

The "graft" latex was blended with the latex of an acrylonitrile/N-phenylmaleimide/methyl acrylate resin as described in Example 13 to give a blend containing 10% of rubber. The superstrate/resin ratio was 0.07. The product was isolated using 0.75% aqueous calcium chloride and washed and dried. It gave transparent yellow mouldings at 200° C.: full Vicat softening point 95° C.; yielding stress 7.7 kg./mm.²; toughness 2.28 J/cm.²

EXAMPLE 15

A rubber "graft" for blending with a separately prepared resin was made by copolymerising acrylonitrile (75% molar), N-phenylmaleimide (5% molar) and methyl acrylate (20% molar) in the presence of a polybutadiene latex containing 39.5% solids.

The latex (177.2 g.) was placed with water (680 cm.³) and ammonium persulphate (1.40 g.) in a one-litre shaking autoclave which was then thrice pressurised to 7 kg./cm.² with nitrogen and vented. Acrylonitrile (61.5 cm.³), N-phenylmaleimide (10.1 g.) and methyl acrylate (22.7 cm.³) were added and the autoclave was again thrice pressurised to 7 kg./cm.² with nitrogen and vented. The autoclave was shaken at 60° C. for 17 hours under nitrogen at 1.0 to 1.8 kg./cm.². The resulting latex contained 15.7% solids of which 47% was rubber.

A sample of the "graft" isolated as in Example 13 gave transparent brown mouldings at 200° C.: full and one-tenth Vicat softening points 89° C. and 78° C. respectively; yielding stress 2.0 kg./cm.²

The "graft" latex was blended with the latex of an acrylonitrile/N-phenylmaleimide/methyl acrylate resin as described in Example 13 to give blends containing 10% and 20% of rubber, which were isolated as before. Their properties are tabulated below.

| Percent rubber in blend | 10 | 20 |
|---|---|---|
| Superstrate/resin ratio | 0.14 | 0.39 |
| Yielding stress, kg./mm.² | 9.1 | 7.3 |
| Toughness, J/cm.² | 0.25 | 0.95 |

EXAMPLE 16

Rubber "grafts" were made as described in Example 15 but using 0.5 cm.³, 0.96 cm.³ and 1.93 cm.³ octanethiol in the polymerisation mixture. The "graft" latices were blended with the latex of an acrylonitrile/N-phenylmaleimide/isobutene resin as described in Example 12 to give products containing 10% and 20% of rubber. The properties of the "grafts" and blends, isolated as before, are tabulated below.

| | | | |
|---|---|---|---|
| Octanethiol used (cm.³) | 0.5 | 0.96 | 1.93 |
| "Grafts": | | | |
| Full Vicat softening point, ° C | 93 | 96 | 91 |
| 1/10 Vicat softening point, ° C | 83 | 85 | 80 |
| Yielding stress, kg./mm.² | 3.1 | 3.1 | 2.8 |
| Percent of rubber by weight | 48 | 48 | 48 |
| Blends containing 10% of rubber (superstrate/resin ratio 0.14): | | | |
| Yielding stress, kg./mm.² | 10.0 | 10.0 | 9.5 |
| Toughness, J/cm.² | 0.14 | 0.07 | 0.16 |
| Blends containing 20% of rubber (superstrate/resin ratio 0.38): | | | |
| Yielding stress, kg./mm.² | 8.1 | 8.0 | 7.7 |
| Toughness, J/cm.² | 0.61 | 0.63 | 0.67 |

EXAMPLE 17

A rubber "graft" was made as described in Example 15 but using isobutene (21.9 cm.³, 20% molar) instead of methyl acrylate. The isobutene was added as a separate step after the other monomers and after the cycle of pressurising with nitrogen and venting, and the polymerisation was conducted for 16 hours at 60° C. under nitrogen at 4 to 8 kg./cm.². The solids in the resulting latex contained 55% of rubber.

A sample of the "graft" isolated as in Example 13 gave transparent amber mouldings: full and one-tenth Vicat softening points 107° C. and 94° C. respectively; yielding stress 2.2 kg./mm.²

The "graft" latex was blended with the latex of an acrylonitrile/N-phenylmaleimide/isobutene resin as described in Example 12 to give products containing 10% and 20% of rubber which were isolated as before. Their properties are tabulated below.

| Percent rubber in blend | 10 | 20 |
|---|---|---|
| Superstrate/resin ratio | 0.10 | 0.25 |
| Yielding stress, kg./mm.² | 9.8 | 7.6 |
| Toughness, J/cm.² | 0.18 | 0.37 |

EXAMPLE 18

A polybutadiene latex (186.6 g.; 70 g. solids), water (650 cm.³), ammonium persulphate (1.4 g.), and acrylonitrile (79.9 cm.³; 1.2 moles) were added to a one-litre shaking autoclave. Air was removed and replaced by nitrogen. Isobutene (28.4 cm.³, 0.3 mole) was added and the reaction mixture was shaken for 2 hours at 20° C. and then for 16 hours at 80° C. under nitrogen at about 7 kg./cm.². The solids in the resulting white latex contained 50.7% rubber.

A sample of the latex was coagulated with an equal volume of 0.75% aqueous calcium chloride at 70° C. The "graft" copolymer was washed twice with water and dried. On moulding at 200° C. it gave transparent amber plaques having full and one-tenth Vicat softening points of 92° C. and 77° C. respectively and a yielding stress of 2.5 kg./mm.²

The "graft" latex was blended with a latex of a homogeneously copolymerised copolymer of acrylonitrile (78% molar) and styrene (22% molar) to give a blend containing 20% of rubber. The superstrate/resin ratio was 0.31. The blended latex was coagulated with 1.5 volumes of 0.75% aqueous calcium chloride at 70° C. and the product was washed twice with water and dried. It gave translucent compression-mouldings having full and one-tenth Vicat softening points of 104° C. and 92° C. respectively, a yielding stress of 6.4 kg./mm.² and a toughness in the notched specimen impact test of 3.77 J/cm.². A similarly prepared blend containing 15% of rubber (superstrate/resin ratio 0.20) had a yielding stress of 7.1 kg./mm.² and a toughness of 2.70 J/cm.²

The acrylonitrile/styrene copolymer used to make the blend had, when isolated, a reduced viscosity of 0.88 at 0.5% in dimethylformamide at 25° C. and an impact strength of 4.5 J/cm.³ in an unnotched specimen test. This test was carried out on a specimen 0.9 cm. wide and 0.3 cm. thick, resting horizontally (with the narrow face uppermost) against two supports 3.8 cm. apart. The specimen was struck centrally on the wider face by a horizontally moving pendulum falling from 30 cm., with more than sufficient energy to break the specimen. From the residual energy of the pendulum, the energy required to break the specimen was calculated and then divided by the effective volume (⅛ x 3.8 x 0.9 x 0.3 cm.³). The resulting value (expressed in joules/cm.³) represented the energy required to cause cracks to form in the material.

EXAMPLE 19

A "graft" was prepared as described in Example 18, except the reaction mixture was shaken throughout at 60° C. for 16.5 hours. The resulting white latex contained 15.2% solids of which 50.7% was rubber. The isolated graft had full and one-tenth Vicat softening points of 93° C. and 79° C. respectively and a yielding stress of 2.7 kg./mm.². Latex blending with an acrylonitrile/styrene copolymer latex as before gave a blend containing 10% of rubber (superstrate/resin ratio 0.12) having a yielding stress of 7.8 kg./mm.² and a toughness of 1.00 J/cm.². The isolated acrylonitrile/styrene copolymer used for this had a reduced viscosity of 0.77 at 0.5% in dimethylformamide at 25° C. and an unnotched impact strength of 5.9 J/cm.³. A blend containing 20% of rubber (superstrate/resin ratio 0.31) made with the resin as used in Example 18 had a yielding stress of 6.4 kg./mm.² and a toughness of 2.86 J/cm.².

EXAMPLE 20

A "graft" was prepared as described in Example 19; it contained 50.6% rubber and had full and one-tenth Vicat softening points of 104° C. and 80° C. respectively and a yielding stress of 2.8 kg./mm.². This "graft" was latex-blended with a series of homogeneously copolymerised acrylonitrile/styrene (molar ratio 78:22 latices, the copolymers having different reduced viscosities (at 0.5% in dimethylformamide at 25° C., to give blends containing 20% of rubber (superstrate/resin ratio 0.32. The results are tabulated below.

| Properties of copolymer: | | | | |
|---|---|---|---|---|
| Reduced viscosity | 0.60 | 0.68 | 0.85 | 1.12 |
| Unnotched impact strength, J/cm.³ | 2.6 | 2.9 | 4.2 | 5.3 |
| Vicat softening point, °C.: | | | | |
| Full | 103 | 105 | 107 | 106 |
| ⅒ | 96 | 95 | 101 | 96 |
| Properties of blend: | | | | |
| Yielding stress, kg./mm.² | 6.3 | 6.3 | 6.3 | 6.7 |
| Toughness, J/cm.² | 1.84 | 2.00 | 2.63 | 4.03 |
| Vicat softening point °C.: | | | | |
| Full | 106 | 107 | 108 | 109 |
| ⅒ | 95 | 92 | 96 | 98 |

EXAMPLE 21

"Graft" copolymers were made as described in Example 18, except that the polymerisation mixture was shaken initially at 20° C. for 2 hours and then at 80° C. for 4 hours. The table below shows the properties of the "grafts" and of the blends containing 20% of rubber made by latex-blending with the homogeneously copolymerised acrylonitrile/styrene latex as used in Example 18; the effect of including octanethiol as a chain transfer agent in the polymerisation mixtures is also shown.

| Octanethiol, cm.³ | 0 | 0.48 | 0.95 | 1.92 |
|---|---|---|---|---|
| Graft latex, percent: | | | | |
| Solids content | 15.3 | 15.2 | 15.6 | 15.9 |
| Rubber in solids | 49.9 | 50.0 | 48.9 | 48.0 |
| Graft copolymer: | | | | |
| Full Vicat, °C | 112 | 104 | 89 | 97 |
| ⅒ Vicat, °C | 82 | 82 | 73 | 78 |
| Yielding stress | 3.4 | 3.4 | 3.2 | 3.0 |
| Blend: | | | | |
| Superstrate/resin ratio | 0.34 | 0.33 | 0.36 | 0.37 |
| Full Vicat, °C | 106 | 105 | 105 | 105 |
| ⅒ Vicat, °C | 97 | 87 | 81 | 94 |
| Yielding stress | 6.9 | 6.8 | 6.5 | 6.4 |
| Toughness | 1.96 | 1.89 | 2.08 | 2.07 |

EXAMPLE 22

A polybutadiene latex (189.8 g.; 70 g. solids, water (640 cm.³), ammonium persulphate (1.4 g.), acrylonitrile (79.9 cm.³; 1.2 mole) and ethyl vinyl ether (28.8 cm.³; 0.3 mole were added to a one-litre shaking autoclave. Air was removed and replaced by nitrogen and the mixture was polymerised for 16 hours at 60° C. under nitrogen at 7 kg./cm.². The resulting white latex contained 16.1% solids of which 47.4% was rubber. A sample of the "graft" copolymer isolated with 0.75% aqueous calcium chloride as before gave transparent amber mouldings having full and one-tenth Vicat softening points of 71° C. and 59° C. respectively and a yielding stress of 2.8 k.g./mm.². The "graft" latex was blended with the homogeneously copolymerised acrylonitrile/styrene latex as used in Example 18 to give a blend containing 20% rubber (superstrate/resin ratio 0.38). When isolated, it gave translucent compression-mouldings having full and one-tenth Vicat softening points of 104° C. and 94° C. respectively, a yielding stress of 6.4 kg./mm.² and a toughness of 1.84 J/cm.².

EXAMPLE 23

A polybutadiene latex (184 g.; 70 g. solids), water (650 cm.³), ammonium persulphate (1.4 g.), acrylonitrile (79.9 cm.³; 1.2 mole) and methyl acrylate (27.1 cm.³; 0.3 mole) were polymerised under nitrogen in a one-litre shaking autoclave for 16 hours at 80° C. The resulting "graft" latex contained 16.6% solids of which 45.7% was rubber. This was latex-blended with a homogeneously copolymerised acrylonitrile/styrene latex (molar ratio 78:22, reduced viscosity 0.86 at 0.5% in dimethylformamide at 25° C.) to give a tough strong blend containing 20% of rubber and having superstrate/resin ratio of 0.42.

EXAMPLE 24

A polybutadiene latex (175.5 g.; 70 g. solids), water (655 cm.³), ammonium persulphate (1.4 g.), acrylonitrile (66.5 g.; 1.0 mole) and isobutene (39.9 cm.³; 0.43 mole; added separately as before) were polymerised under nitrogen in a one-litre shaking autoclave for 4 hours at 20° C. and then for 12 hours at 80° C. The resulting "graft" latex contained 14.4% solids of which 53.7% was rubber. The isolated "graft" had a yielding stress of 1.8 kg./mm.². The "graft" was latex-blended as before with the acrylonitrile/styrene copolymer as used in Example 18 to give a blend containing 20% of rubber (superstrate/resin ratio 0.27) and having a yielding stress of 6.3 kg./mm.² and a toughness of 3.05 J/cm.².

We claim:
1. A thermoplastic blend of
    (A) a graft copolymer comprising:
        (i) a substrate of a diene rubber containing 40% to 100% molar of at least one conjugated 1,3-diene monomer and from 0 to 60% molar of at least one ethylenically unsaturated monomer copolymerizable therewith using free radical catalysts and
        (ii) a superstrate, which consists essentially of from 60% to 84% molar of acrylonitrile units, from 0% to 20% molar units of at least one N-aryl maleimide and, from 5% to 35% molar of units of at least one alkene containing 2 to 18 carbon atoms and
    (B) a separately prepared copolymerized resin consisting essentially of 60% to 84% molar of units from acrylonitrile, 40% to 16% molar units from at least one ethylenically unsaturated comonomer which is copolymerizable with acrylonitrile selected from alkenes, dienes, esters of acrylic and methacrylic acids, vinyl esters, vinyl ethers, esters of fumaric acid, unsaturated nitriles, vinyl chloride, vinylidene chloride and conjugated aromatic olefins, and 0% to 20% molar of units of at least one N-aryl maleimide, the blend containing from 1% to 50% by weight of rubber, the ratio of the superstrate to the separately prepared resin in the blend being less than 1.6.

2. A blend of a graft copolymer according to claim 1 wherein the separately prepared resin contains 60% to 84% molar of units from acrylonitrile, 40% to 16% molar of units from at least one ethylenically unsaturated comonomer selected from alkenes, dienes, esters of acrylic and methacrylic acids, vinyl esters, vinyl ethers, esters of fumaric acid, unsaturated nitriles, vinyl chloride and vinylidene chloride, and 0% to 20% molar of units from at least one N-aryl maleimide, the blend containing from 1% to 50% by weight of rubber, the ratio of superstrate to the separately prepared resin in the blend being less than 1.6.

3. A thermoplastic blend of
(A) a graft copolymer comprising:
  (i) a substrate of a diene rubber containing 40% to 100% molar of at least one conjugated 1,3-diene monomer and from 0 to 60% molar of at least one ethylenically unsaturated monomer copolymerisable therewith using free radical catalysts and
  (ii) a superstrate, which consists essentially of from 60% to 84% molar of acrylonitrile units, from 0% to 20% molar units of at least one N-aryl maleimide, and from 5% to 35% molar of units of at least one alkene containing 2 to 18 carbon atoms, and
(B) a separately prepared homogeneously copolymerised resin consisting essentially of 60% to 84% molar of units from acrylonitrile, 40% to 16% molar of units from at least one conjugated aromatic olefin, and 0% to 20% molar of units from at least one N-aryl maleimide, the blend containing from 1% to 50% by weight of rubber.

4. A thermoplastic polymer blend consisting essentially of
(A) a homogeneously copolymerised resin consisting essentially of 60% to 84% molar of acrylonitrile units and 16% to 40% molar of styrene units, and
(B) a graft copolymer comprising:
  (i) a substrate of a diene rubber containing 40% to 100% molar of at least one conjugated 1,3-diene monomer and from 0% to 60% molar of at least one ethylenically unsaturated monomer copolymerisable therewith using free radical catalysts and
  (ii) a superstrate, which consists essentially of from 60% to 84% molar of acrylonitrile units, from 0% to 20% molar units of at least one N-aryl maleimide, and from 5% to 35% molar of units of at least one alkene containing 2 to 18 carbon atoms, said blend containing 1% to 50% by weight of rubber.

5. A thermoplastic blend of
(A) a graft copolymer comprising:
  (i) a substrate of a diene rubber containing 40% to 100% molar of at least one conjugated 1,3-diene monomer and from 0 to 60% molar of at least one ethylenically unsaturated monomer copolymerisable therewith using free radical catalysts and
  (ii) a superstrate, which consists essentially of from 60% to 84% molar of acrylonitrile units, from 0% to 20% molar units of at least one N-aryl maleimide, and from 5% to 35% molar of units of at least one alkene containing 2 to 18 carbon atoms and
(B) a separately prepared copolymerised resin consisting essentially of 60% to 84% molar of units from acrylonitrile, 40% to 16% molar units from at least one ethylenically unsaturated comonomer selected from alkenes, dienes, esters of acrylic and methacrylic acids, vinyl esters, vinyl ethers, esters of fumaric acid, unsaturated nitriles, vinyl chloride and vinylidene chloride, and 0% to 1% molar units of at least one N-aryl maleimide, the blend containing from 1% to 50% by weight of rubber, the ratio of superstrate to the separately prepared resin in the blend being less than 1.6.

6. A thermoplastic blend of
(A) a graft copolymer comprising:
  (i) a substrate of a diene rubber containing 40% to 100% molar of at least one conjugated 1,3-diene monomer and from 0 to 60% molar of at least one ethylenically unsaturated monomer copolymerizable therewith using free radical catalysts and
  (ii) a superstrate, which consists essentially of from 45% to 90% molar of acrylonitrile units, from 0% to 20% molar units of at least one N-aryl maleimide and, from 5% to 35% molar units of at least one alkene containing 2 to 18 carbon atoms and
(B) a separately prepared copolymerized resin consisting essentially of 45% to 90% molar of units from acrylonitrile, 40% to 16% molar units from at least one ethylenically unsaturated comonomer selected from alkenes, dienes, esters of acrylic and methacrylic acids, vinyl esters, vinyl ethers, esters of fumaric acid, unsaturated nitriles, vinyl chloride, vinylidene chloride and conjugated aromatic olefins, and 0% to 20% molar units of at least one N-aryl maleimide, the blend containing from 1% to 50% by weight of rubber, the ratio of the superstrate to the separately prepared resin in the blend being less than 1.6.

References Cited
UNITED STATES PATENTS

| | | | |
|---|---|---|---|
| 2,802,809 | 8/1957 | Hayes | 260—876 |
| 3,153,014 | 10/1964 | Fletcher et al. | 260—879 |
| 3,265,708 | 8/1966 | Stiteler | 260—879 |
| 3,322,852 | 5/1967 | Trementozzi et al. | 260—879 |
| 3,352,832 | 11/1967 | Barr | 260—780 |
| 3,354,108 | 11/1967 | Paradis et al. | 260—876 |
| 3,488,405 | 1/1970 | Trementozzi et al. | 260—876 |

MURRAY TILLMAN, Primary Examiner

J. ZIEGLER, Assistant Examiner

U.S. Cl. X.R.

260—878 R, 879, 881, 883

UNITED STATES PATENT OFFICE
CERTIFICATE OF CORRECTION

Patent No. 3,816,563        Dated June 11, 1974

Inventor(s) Carl Fraser MATHEWS et al

It is certified that error appears in the above-identified patent and that said Letters Patent are hereby corrected as shown below:

In the heading, please add the following information:

Assignee: Imperial Chemical Industries Limited,
London, England

Claims priority, application Great Britain, April 9, 1965, 15191/65, and application Great Britain, January 12, 1966, 1423/66

Signed and sealed this 1st day of April 1975.

(SEAL)
Attest:

RUTH C. MASON
Attesting Officer

C. MARSHALL DANN
Commissioner of Patents
and Trademarks